(12) United States Patent
Hong et al.

(10) Patent No.: US 6,633,983 B1
(45) Date of Patent: Oct. 14, 2003

(54) APPARATUS AND METHOD FOR AUTOMATICALLY STORING FIRST USE DATE OF AN ELECTRONIC DEVICE

(75) Inventors: Joon-kee Hong, Suwon (KR); Sang-rok Han, Suwon (KR); Yeon-taek Han, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/339,171

(22) Filed: Jun. 24, 1999

(30) Foreign Application Priority Data

Jun. 29, 1998 (KR) .............................................. 98-24998

(51) Int. Cl.[7] .................................................. G06F 1/24
(52) U.S. Cl. ...................... 713/200; 713/201; 713/165; 713/166; 713/167
(58) Field of Search ............................... 713/200, 201, 713/165, 166, 167

(56) References Cited

U.S. PATENT DOCUMENTS 5,367,452 A * 11/1994 Gallery et al. ................. 705/28
5,495,531 A *  2/1996 Smiedt ........................ 705/59

* cited by examiner

Primary Examiner—Thomas R. Peeso
(74) Attorney, Agent, or Firm—Sughrue Mion, PLLC

(57) ABSTRACT

An apparatus and method for storing data related to service of an electronic device, in particular, an apparatus and method for automatically storing information concerning the first use date after purchase for verifying the warranty period of the electronic device. When an electronic device is used for the first time after being purchased, the date information necessary for verifying a warranty period is automatically stored, thereby settling disputes concerning warranty periods. Also, the cost for repairing products for which the warranty period has already elapsed can be greatly reduced.

14 Claims, 3 Drawing Sheets

APPARATUS AND METHOD FOR AUTOMATICALLY STORING FIRST USE DATE OF AN ELECTRONIC DEVICE

BACKGROUND OF THE INVENTION

1. Field of the Invention

The present invention relates to an apparatus and method for inputting data related to the service of an electronic device, and more particularly, to a method for automatically storing information on the first date that an electronic device is used after purchase, for purposes of verifying the warranty period of the electronic device.

2. Description of the Related Art

In the event that an abnormality occurs in product quality during a predetermined warranty period, a supplier customarily repairs the defective product or replaces the same with a new one free of charge.

In servicing the defective product, in order to check whether the product is under its warranty period, a label or tag is fixed on a written guarantee or an outer surface of the product and the purchase date of the product is written thereon by vendors. However, vendors seldom write the purchase date on the written guarantee, label or tag. Also, even when vendors write the purchase date, customers may often lose the written guarantee, label or tag indicating the purchase date.

A problem also occurs because some customers intentionally discard the written guarantee and request free servicing, even if the warranty period has expired. Although improper, this practice is quite common.

Most Korean domestic suppliers of electronic appliances and products render a two-year warranty period. Also, since customers seldom hold the written guarantee, it is a customary practice to grant a 30-month warranty period from the manufacturing date. However, even if the 30-month warranty period has elapsed, in order to avoid a dispute with customers who insist on a warranty, free servicing is customarily rendered. Therefore, the product suppliers incur unplanned costs in connection with these extra servicing expenses. Also, in determining the warranty period, disputes with customers may occur, which impairs the establishment and maintenance of good relationships with customers.

SUMMARY OF THE INVENTION

To solve the above problems, it is an object of the present invention to provide an apparatus and method for automatically storing the first date that an electronic device is used after purchasing the product.

Accordingly, to achieve the above object, there is provided an apparatus for storing information concerning the first date that an electronic device is used, the apparatus including (1) a clock data generator, which receives power from an auxiliary power supply portion, for generating time information, (2) a memory for storing the time information, and (3) a controller for determining whether or not there is a connection to a main power supply for operating the electronic device and whether or not there is a specific key input after the connection to the main power supply, for determining whether or not the time information stored in the memory equals an initially set value if there is the connection to the main power supply or the specific key input, and for automatically storing the time information generated from the clock data generator.

According to another aspect of the present invention, there is provided a method for storing information concerning the first date of use of an electronic device having a clock data generator, a memory and a controller, the method including the steps of (a) determining whether or not a specific command is input to the controller, (b) if it is determined in step (a) that the specific command is input to the controller, determining whether or not date information is stored in a memory area for storing the information concerning the first date of use of the electronic device, and (c) if it is determined in step (b) that the date information is not stored in the memory area, storing the date information generated from the clock data generator in the memory area.

Alternatively, according to the present invention, there is provided a method for storing information concerning the first date of use of an electronic device having a clock data generator, a memory and a controller, the method including the steps of (a) determining whether or not a first specific command is input to the controller, (b) if it is determined in step (a) that the first specific command is input to the controller, storing date information generated from the clock data generator in a memory area for storing information concerning the manufacture date of the electronic device, (c) determining whether or not a second specific command is input to the controller, (d) if it is determined in step (c) that the second specific command is input, determining whether date information is stored in the memory area for storing the manufacture date and a memory area for storing the first use date, and (e) if it is determined in step (d) that date information is stored in the manufacture date storing area but date information is not stored in the first use date storing area, storing date information generated from the clock data generator in the first use date storing area.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Preferred embodiments of the present invention will be described in detail with reference to the accompanying drawings.

Figure 1:
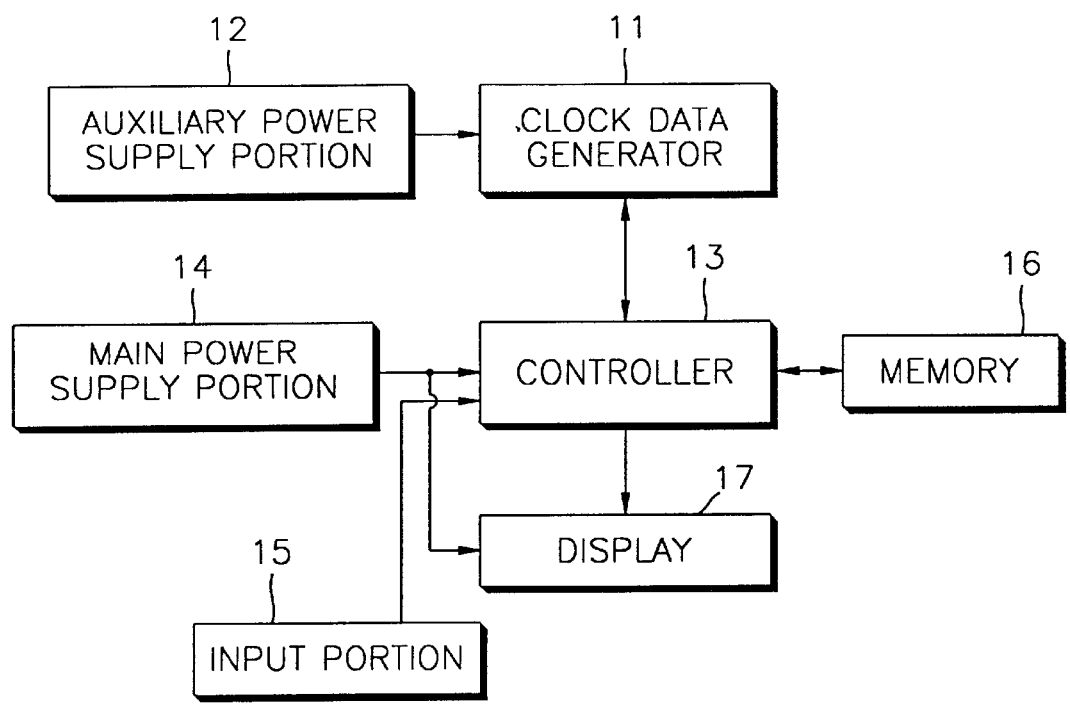
FIG. 1 is a schematic diagram illustrating an apparatus for automatically storing the first use date of an electronic device according to the present invention.

As shown in FIG. 1, an apparatus for automatically storing the first date of use of an electronic device, according to the present invention, includes a clock data generator 11, an auxiliary power supply portion 12, a controller 13, a main power supply portion 14, an input portion 15, a memory 16 and a display 17.

The clock data generator 11 generates time information containing at least year, month and date. In general, the time information is generated by a timer integrated circuit in the clock data generator 11. Otherwise, the time information may be generated by a timer integrated circuit incorporated in a microprocessor of a controller.

The clock data generator 11 receives power from the auxiliary power supply portion 12, such as an internal battery. The reason for designing the clock data generator 11 so that it receives power from the auxiliary power supply portion 12 is to permit the generation of the current time information even when the main power, supplied by connecting a power cord to the electronic device via its main power supply portion 14, is not supplied.

The main power supply portion 14 supplies power necessary for various parts of the electronic device, including the controller 13.

The input portion 15 is an input device having keys for inputting operation commands for operating the electronic device according to a user's intention, and can be implemented by a remote controller or function key input apparatus installed on a front panel of the electronic device.

The memory 16 can output data stored at a specific address or input data to a specific address in a conventional manner, in response to read/write commands.

The display 17, comprising a CRT, LCD or the like, displays the date information read in accordance with a command issued by the controller 13.

Figure 2:
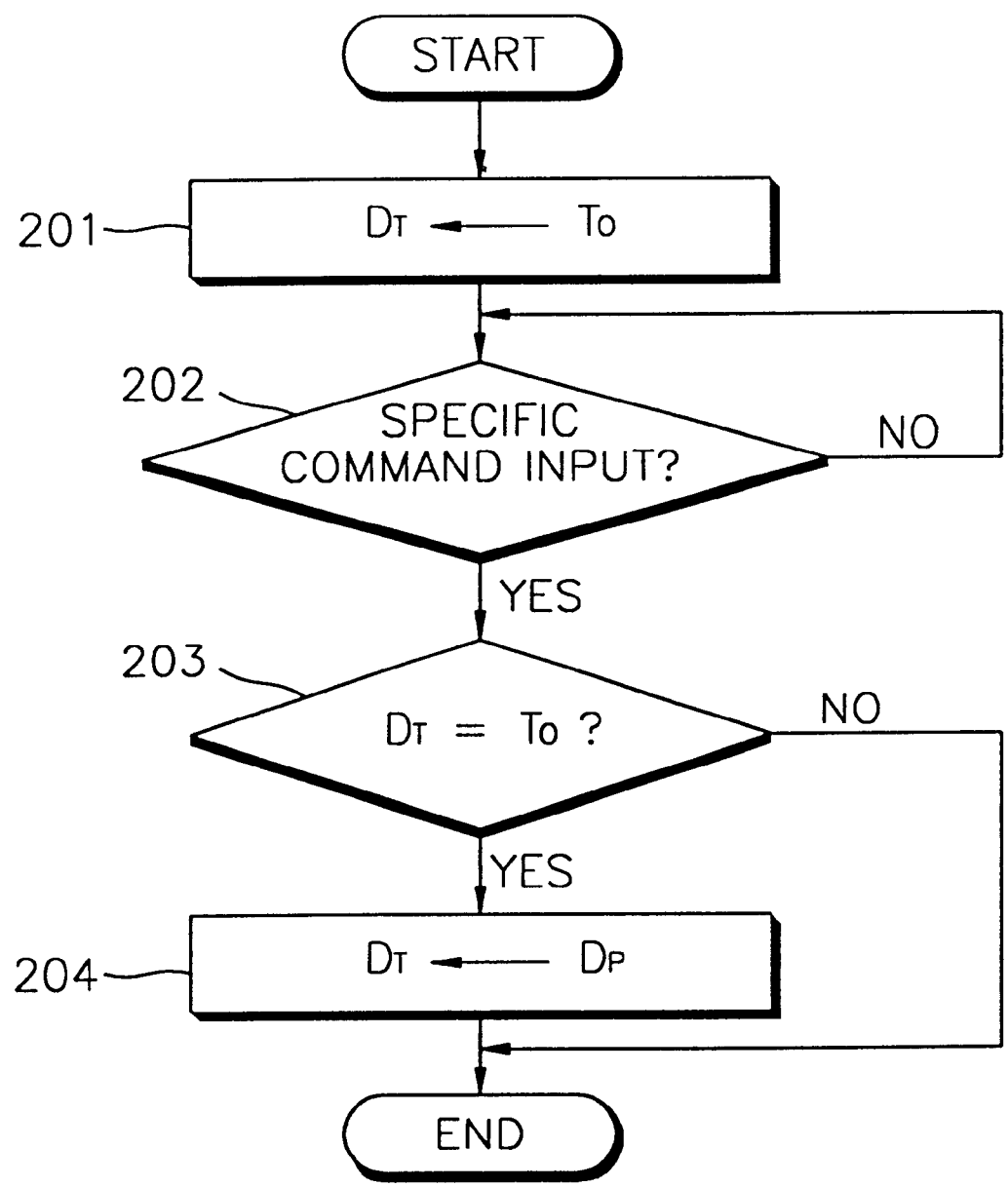
FIG. 2 is a flowchart illustrating a method for automatically storing the first use date of an electronic device according to a first embodiment of the present invention.

A method for storing date information from the clock data generator 11 in the memory 16 under command of the controller 13, or for reading and displaying the date information stored in the memory 16, will be described with reference to FIG. 2. A method of operating the controller 13 will be described with reference to FIG. 3.

First, the operation of the present invention to store date information will be described with reference to FIG. 2.

In step 201, an initial value is set. That is, date data $D_T$ concerning the "first use date" of the product, which is one kind of "service information", is initially set to "$T_0$". This date data will be stored in a specific address of the memory 16, corresponding to an area for storing the first use date information.

In step 202, it is determined whether a user's key input command is input to the controller 13 through the input portion 15. In this case, the command corresponds to a first input command in using the product, for example, a command issued by operation of the "Power On" key. The first input command may differ depending on the kind of product. In other words, in step 202, it is determined whether there is a key command input for operating the product for the first time, after the user has purchased the product.

In step 203, the date data $D_T$ stored in the specific address of the memory 16, concerning the first use date information, is read and it is determined whether the read date data $D_T$ equals "$T_0$". If it is determined that $D_T$ is not equal to "$T_0$", meaning that the first use date previously was written in the specific address of the memory and the product has already been used, the procedure is terminated.

In step 204, if it is determined in step 203 that $D_T$ is equal to "$T_0$", the date data $D_T$ stored in the specific address of the memory 16 is replaced with the present date data $D_P$ generated from the clock data generator 11 by the controller 13 and then is stored. In other words, the present date data $D_P$ is rewritten in the specific address of the memory 16.

Preferably, the memory 16 will not lose the data stored therein, even if the supply of power from the main supply or auxiliary supply is interrupted, because a nonvolatile flash memory can be used as the memory 16.

In the case when the user uses the product for the first time after its purchase, as described above, the date information of the clock data generator 11 to which power is supplied by the auxiliary power supply portion 12 is automatically stored in the memory 16.

Figure 3:
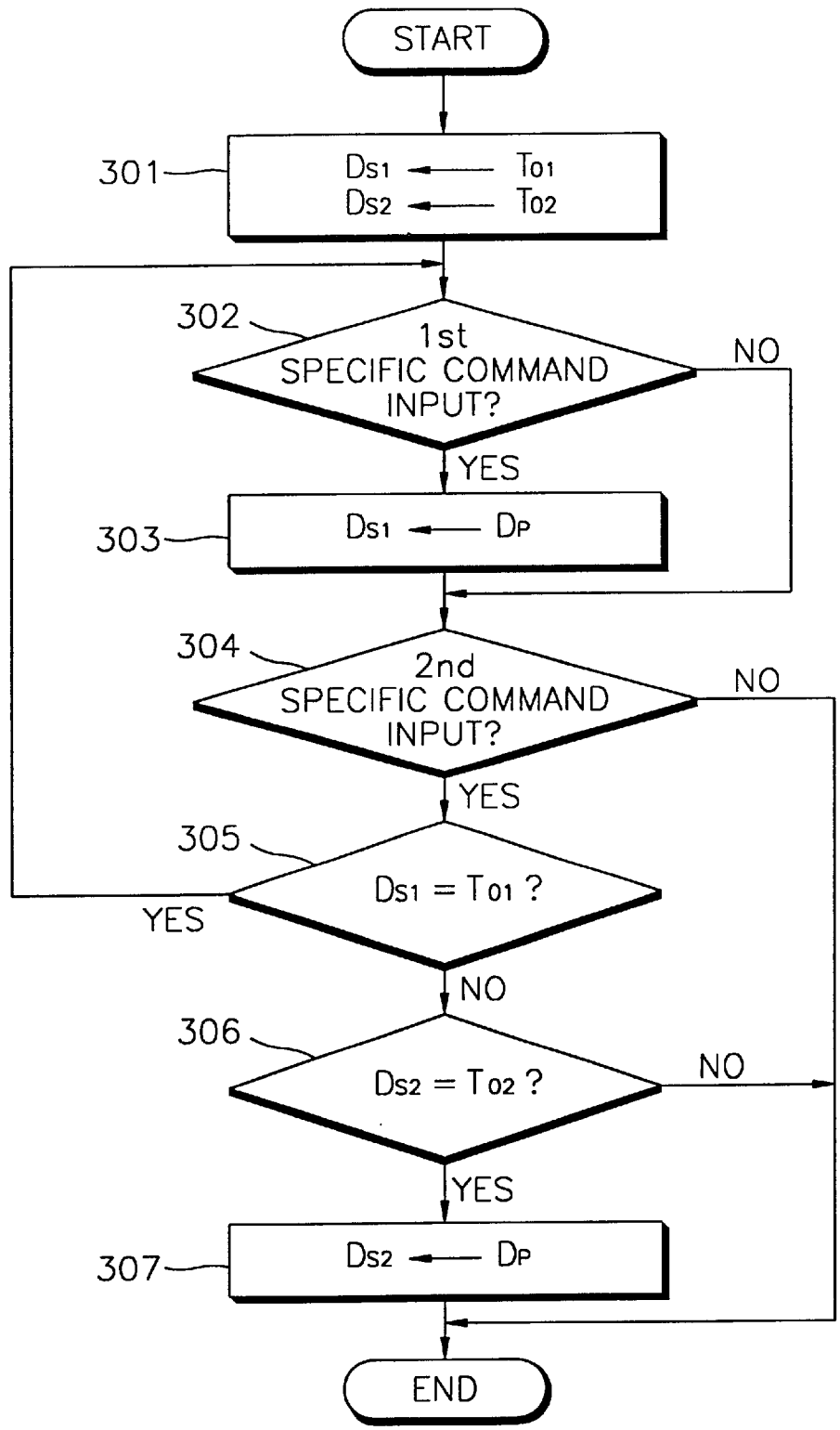
FIG. 3 is a flowchart illustrating a method for automatically storing the first use date of an electronic device according to a second embodiment of the present invention.

Next, a method for controlling operation by the controller 13 will be described with reference to FIG. 3.

In step 301, initial values are set, that is, date data $D_{S1}$ concerning the manufacture date of the product, which is another kind of "service information", is initially set to "$T_{01}$" and date data $D_{S2}$ concerning the first use date of the product is initially set to "$T_{02}$". Both types of data are then stored in specific addresses of the memory 16, corresponding to areas for storing the manufacture date information and the first use date information, respectively.

In step 302, it is determined whether a first predetermined command for storing the manufacture date information in the memory 16, after manufacturing the product and inspecting the quality thereof, is input to the controller 13 through the input portion 15.

The first predetermined command is a command for storing the manufacture date of the product. Thus, keys or buttons are devised such that the first predetermined command is generated only by operating a corresponding key through a supplier's input portion in unit 15, not through a user's input portion of unit 15, thereby effectively storing and using the manufacture date information.

In step 303, if it is determined in step 302 that the first predetermined command is input, the date data $D_{S1}$ concerning the manufacture date information stored in the corresponding address of the memory 16, is replaced with the present date data $D_P$ generated from the clock data generator 11 and then stored.

In step 304, it is determined whether or not a second predetermined user's key input command through the input portion 15 is input to the controller 13. In this case, the second predetermined command corresponds to a first input command in using the product, that is, a command input by operation of the "Power On" key. The first input command in using the product may differ depending on the kind of product. In other words, in step 304, it is determined whether there is a key command input for operating the product for the first time, after the user purchased the product.

In step 305, if it is determined in step 304 that the second predetermined command is input to the controller 13, it is determined whether the data $D_{S1}$ stored in the corresponding address of the memory 16, for storing the manufacture date, equals to the initial value "$T_{01}$". That is, it is determined whether or not the manufacture date information was stored by the supplier.

As a determination result, if $D_{S1}$ equals "$T_{01}$", which means that the manufacture date information was not newly stored, that is, the manufacturing of the product and quality inspection thereof were not completed, the procedure returns to step 302. This is for preventing the information concerning the first use date of the product from being stored during a manufacturing or inspection process. If $D_{S1}$ does not equal "$T_{01}$", the process proceeds to step 306.

In step 306, if it is determined in step 305 that $D_{S1}$ is not equal to "$T_{01}$", that is, new manufacturing date information has been stored, it is determined whether data $D_{S2}$ stored in the specific address of the memory 16, for storing the first use date, equals an initially set value $T_{02}$.

If it is determined in step 306 that $D_{S2}$ stored in the first use date storing address is not equal to $T_{02}$, which means that the first use date information was newly stored by the user after the user purchased the product, the procedure is terminated without updating the date information.

However, if it is determined in step 306 that $D_{S2}$ equals $T_{02}$, which means that the first use date information which was set initially has not yet been updated by the user after the user purchased the product, that is, the product is used for the first time, in step 307, the date data $D_{S2}$ stored in the specific address for storing the first use date of the product is replaced with the present date data $D_P$ generated from the clock data generator 11.

Through the above-described. steps, the manufacture date information and the first use date information are automatically stored in the memory 16.

Next there will be a description of a method for displaying the manufacture date information and the first use date information stored in the memory 16. In detail, a specific key for repair service, which is also called a "factory key", is installed only in a special input device available at service centers or suppliers locations, and not in the key input portion 15 of a user's product. When the factory key is input, the date information stored in the specific address of the memory 16 is read and decoded by the controller 13, and is output to the display 17. By this procedure, the service information can be displayed. The display 17 may take the form of a CRT, LCD or the like, according to the kind of product.

Alternatively, the service information can be displayed as follows. First, a key for displaying the service information, which is called a "factory mode key", is installed in the user's key input portion 15. Then, only when this key is input, the service information stored in the memory 16 is displayed. In this case, the controller 13 can be programmed such that the information on the first use date or manufacture date of the product, stored in the memory 16, cannot be changed.

Through the above-described steps, the information on the date of using a purchased product for the first time is automatically stored. Once the information on the first use date is stored in a memory, the stored information cannot be changed at a user's discretion. Thus, when a quality problem occurs in a product, it is possible to exactly determine whether the product can be covered within the warranty period. Also, the information on the manufacture date can be automatically stored and identified on a display. Thus, this information can be used in performing the repair service.

As described above, according to the present invention, when an electronic device is used for the first time after purchase, the date information necessary for verifying the warranty period is automatically stored, thereby providing accurate information about the applicable warranty period. Also, the cost for repairing products for which the warranty period has already elapsed can be greatly reduced.

The foreign patent application(s) from which priority under 35 USC §119 is claimed, is (are) incorporated herein by reference. Although the invention herein has been described with respect to specific embodiments, it is not limited thereto, and reference should be made to the claims for a definition of the full scope of the invention in accordance with applicable law.

What is claimed is:

1. An apparatus for storing information concerning the first use date of an electronic device, having a main power supply portion and an auxiliary power supply portion, comprising:
   a clock data generator, which receives power from at least the auxiliary power supply portion, for generating time information;
   a memory for storing the time information; and
   a controller (1) for determining whether or not there is a connection of the main power supply portion to a source of power for operating the electronic device and whether or not there is a specific key input after connection of power to the main power supply portion, (2) for determining whether or not the time information stored in the memory equals an initially set value, if there is a connection of power to the main power supply portion or the specific key input, and (3) for automatically storing the time information generated from the clock data generator.

2. The apparatus according to claim 1, further comprising a display portion for displaying the time information stored in the memory if there is an input of an information display command.

3. The apparatus according to claim 1, wherein the memory comprises a nonvolatile flash memory by which the data stored therein is not lost even if the supply of power to the main power supply portion is interrupted, and the time information stored in the memory contains at least year, month and date data.

4. The apparatus according to claim 1, further comprising a key input device, said input device comprising a first portion operative in response to a factory key, and a second portion operative in response to a user input.

5. The apparatus according to claim 1, further comprising a key input device, said input device comprising a first portion operative in response to a factory mode key, and a second portion operative in response to a user input.

6. The apparatus according to claim 1, wherein the memory comprises a first memory area operative to store manufacturing date information and second memory area operative to store first use date information.

7. The apparatus according to claim 6, wherein the controller is operative to automatically store first use date information in said second memory area in response to a connection of the main power supply and a detection that manufacturing data is stored in said first memory area.

8. A method for storing information concerning the first use date of an electronic device having a clock data generator, a memory and a controller, comprising the steps of:
   (a) determining whether or not a specific command is input to the controller;
   (b) if it is determined in step (a) that the specific command is input to the controller, determining whether or not date information is stored in a memory area for storing the information concerning the first use date of the electronic device; and
   (c) if it is determined in step (b) that the date information is not stored in the memory area, storing the date information generated from the clock data generator in the memory area.

9. The method for storing information concerning the first use date of an electronic device as set forth in claim 8, further comprising:
   before step (a), determining whether a prior condition has been satisfied, said specific command being a first use date storage command.

10. A method for storing information concerning the first use date of an electronic device comprising a clock data generator, a memory and a controller, comprising the steps of:
   (a) determining whether or not a first specific command is input to the controller;
   (b) if it is determined in step (a) that the first specific command is input to the controller, storing date information generated from the clock data generator in a memory area for storing information concerning the manufacture date of the electronic device;

(c) determining whether or not a second specific command is input to the controller;

(d) if it is determined in step (c) that the second specific command is input, determining whether date information is stored in the memory area for storing the manufacture date and a memory area for storing the first use date; and (e) if it is determined in step (d) that date information is stored in the manufacture date storing area but date information is not stored in the first use date storing area, storing date information generated from the clock data generator in the first use date storing area.

11. The method according to claim 10, wherein the first specific command can be generated through a key input by a supplier's input portion and not by an input portion provided at user's end, and the second specific command is generated through a key input by the user's input portion.

12. An apparatus for storing information concerning the first use date of an electronic device, having a main power supply portion and an auxiliary power supply portion, comprising:

a clock data generator, which receives power from the auxiliary power supply portion, for generating time information;

a memory for storing the time information, said memory comprising a manufacturing date portion and a first use date portion; and a controller comprising:

first means for determining whether or not there is a connection of the main power supply portion to a source of power for operating the electronic device and whether or not there is a specific key input after connection of power to the main power supply portion, second means for determining whether or not the time information stored in the manufacturing date portion of memory equals an initially set value, if there is a connection of power to the main power supply portion or the specific key input, third means for determining whether or not the time information stored in the first use date portion of memory equals an initially set value, and fourth means responsive to at least one of said second means and said third means for automatically storing in said manufacturing date portion and said first use date portion, the time information generated from the clock data generator.

13. The apparatus according to claim 12, further comprising a display for displaying the time information stored in the memory if there is an input of an information display command.

14. The apparatus according to claim 12, wherein the memory comprises a nonvolatile flash memory by which the data stored therein is not lost even if the supply of power to the main power supply portion is interrupted, and the time information stored in the memory contains at least year, month and date data.

* * * * *